J. L. PENNOCK.
Puddling Furnaces.

No. 153,110. Patented July 14, 1874.

UNITED STATES PATENT OFFICE.

JOSEPH L. PENNOCK, OF COATESVILLE, PENNSYLVANIA.

IMPROVEMENT IN PUDDLING-FURNACES.

Specification forming part of Letters Patent No. 153,110, dated July 14, 1874; application filed May 28, 1874.

*To all whom it may concern:*

Be it known that I, JOSEPH L. PENNOCK, of Coatesville, Chester county, Pennsylvania, have invented certain Improvements in Furnaces, of which the following is a specification:

The object of my invention is to maintain the integrity of puddling-furnaces for a longer time than usual, and to economize the consumption of the iron or "fix" which is usually employed as a lining for puddling-furnaces; and these objects I attain by means of cast-iron chills, through which steam is caused to circulate, with or without air, in the manner described hereafter.

Figure 1:
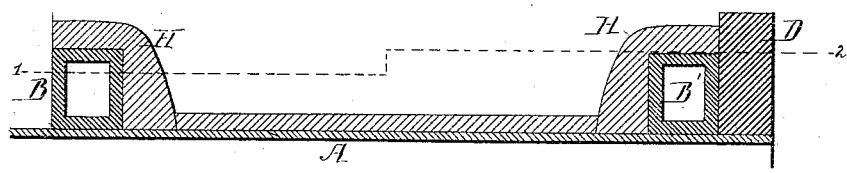
Figure 2:
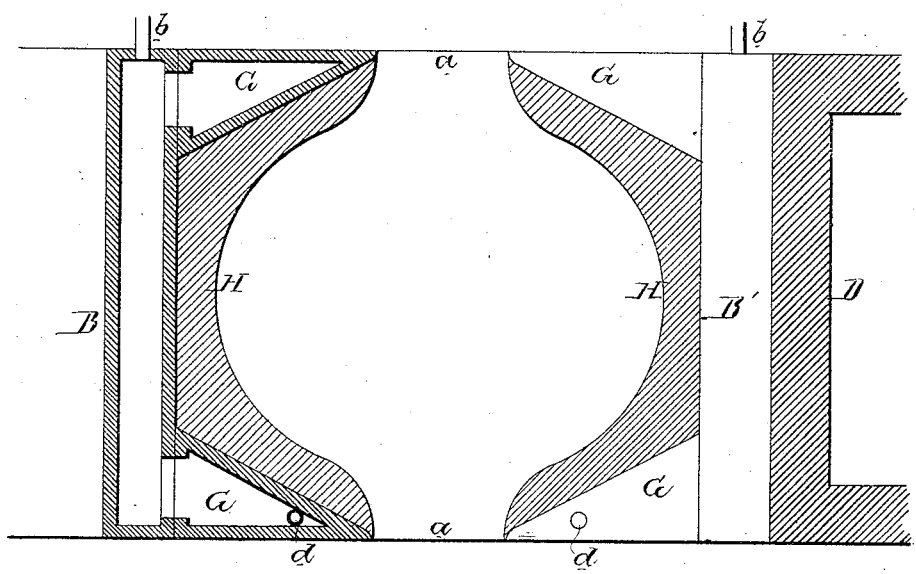

Figure 1 of the accompanying drawing represents a vertical section of the bed of a puddling-furnace, and Fig. 2 a sectional plan on the line 1 2, Fig. 1. A is a cast-iron plate, which, as usual, supports the bed of the furnace, and B and B' are two hollow cast-iron chills, extending entirely across the bed, as shown in Fig. 2, the chill B' being situated directly behind the bridge-wall D. At opposite sides of the furnace are the usual doorways $a$ $a$, toward which are directed the tapering ends of the hollow cast-iron cheeks G, the latter, although cast separately from the chills, communicating freely therewith, as shown in Fig. 2. Steam-pipes $b$ communicate with the chills, so that live steam may at all times pervade the interior of both chills and cheeks, there being an outlet at $d$ for the escape of the steam.

There may be, in the end of each chill, an opening larger than the pipe $b$, which projects into the said chill, so that air may enter with the steam.

H represents the refractory iron ore, technically termed the fix, which is banked up against and over the top of each chill, as shown in Fig. 1.

Chills through which water is caused to circulate have frequently been used in connection with puddling-furnaces, but they are very apt to break, and, in some cases, to explode, and endanger the lives of the attendants. Owing to this, their frequent removal is demanded, and this cannot be accomplished without disturbing the integrity of the furnace.

I have ascertained that chills never crack under the influence of steam, and that the refractory ore or fix H will last much longer when banked against the steam-chills. Practical tests have proved that the steam-chills effect a saving of this iron or fix to the extent, at the lowest estimate, of two hundred pounds to the ton of iron manufactured.

I claim as my invention—

The mode described of maintaining the chills of furnaces at the required temperature—that is, by means of currents of steam, or steam and air combined, passed through the chills, as set forth.

In testimony whereof I have signed my name to this specification in the presence of two subscribing witnesses.

JOSEPH L. PENNOCK.

Witnesses:
WM. A. STEEL,
HARRY SMITH.